US012138848B2

(12) United States Patent
Wang et al.

(10) Patent No.: US 12,138,848 B2
(45) Date of Patent: *Nov. 12, 2024

(54) LONG DECORATIVE MATERIAL WITH EMBOSSING IN REGISTER WITH PATTERN AND ROLLING METHOD AND DEVICE THEREFOR

(71) Applicant: FLOORING INDUSTRIES LIMITED, SARL, Bertrange (LU)

(72) Inventors: Yibing Wang, Huzhou (CN); Wenjin Tang, Huzhou (CN); Caiqin Zhu, Huzhou (CN)

(73) Assignee: UNLIN, BV, Wielsbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,835

(22) Filed: Mar. 13, 2023

(65) Prior Publication Data

US 2023/0211544 A1 Jul. 6, 2023

Related U.S. Application Data

(63) Continuation of application No. 15/270,279, filed on Sep. 20, 2016, now Pat. No. 11,633,905, which is a
(Continued)

(30) Foreign Application Priority Data

Jun. 15, 2016 (CN) .......................... 201610415455.9

(51) Int. Cl.
*B29C 59/04* (2006.01)
*B32B 27/08* (2006.01)
(Continued)

(52) U.S. Cl.
CPC ............ *B29C 59/046* (2013.01); *B32B 27/08* (2013.01); *B32B 27/304* (2013.01);
(Continued)

(58) Field of Classification Search
CPC .... B29C 59/046; B29C 55/00; B32B 37/0053
See application file for complete search history.

(56) References Cited

U.S. PATENT DOCUMENTS 2,831,097 A * 4/1958 Malewski ............. B29C 33/065
165/89
3,024,154 A * 3/1962 Singleton ................ B44C 3/085
264/284
(Continued)

FOREIGN PATENT DOCUMENTS

CN 2210082 Y 10/1995
CN 1420025 A 5/2003
(Continued)

*Primary Examiner* — Andrew D Graham
(74) *Attorney, Agent, or Firm* — Workman Nydegger (57) ABSTRACT

A method is provided for manufacturing flooring planks including a plastic base and an image plastic layer. The method includes a feeding step of feeding a layered raw material of a long decorative material to be rolled into oppositely rolling rollers; and a rolling step of hot rolling an embossing on the transparent plastic layer. A feeding tension of a printed plastic layer is adjusted according to a longitudinal deviation between the embossing and the pattern in the rolling step. The device includes a first feeding device, a second feeding device, the oppositely rolling rollers, a detecting device, and a tension controller disposed on the second feeding device. According to the long decorative material with the embossing in register with the pattern manufactured by the method, the embossing hot-rolled on the transparent plastic layer is in register with the pattern on the printed plastic layer.

10 Claims, 6 Drawing Sheets

Related U.S. Application Data continuation of application No. PCT/CN2016/088043, filed on Jun. 30, 2016.

(51) Int. Cl.

| | | |
|---|---|---|
| *B32B 27/30* | (2006.01) | |
| *B32B 37/20* | (2006.01) | |
| *B32B 38/06* | (2006.01) | |
| *E04F 15/10* | (2006.01) | |
| *B29C 37/00* | (2006.01) | |
| *B29K 627/06* | (2006.01) | |
| *B29L 31/00* | (2006.01) | |

(52) U.S. Cl.

CPC ............ *B32B 37/203* (2013.01); *B32B 38/06* (2013.01); *E04F 15/105* (2013.01); *B29C 2037/90* (2013.01); *B29K 2627/06* (2013.01); *B29K 2995/0026* (2013.01); *B29L 2031/722* (2013.01); *B32B 2250/03* (2013.01); *B32B 2250/24* (2013.01); *B32B 2307/4023* (2013.01); *B32B 2307/412* (2013.01); *B32B 2307/538* (2013.01); *B32B 2307/75* (2013.01); *B32B 2327/06* (2013.01); *B32B 2419/04* (2013.01); *B32B 2451/00* (2013.01)

(56) References Cited

U.S. PATENT DOCUMENTS

| | | | | |
|---|---|---|---|---|
| 3,196,062 A * | 7/1965 | Kristal | .................... | B32B 37/00 156/209 |
| 3,471,354 A * | 10/1969 | Scofield | ................. | B32B 27/00 118/44 |
| 3,741,851 A * | 6/1973 | Erb et al. | ............. | B29C 59/046 428/161 |
| 3,953,639 A * | 4/1976 | Lewicki, Jr. | .......... | B29C 59/046 428/159 |
| 3,959,567 A * | 5/1976 | Bradley | ............ | B29C 66/91421 264/83 |
| 4,069,081 A * | 1/1978 | Drower | ............... | B32B 37/0053 156/324 |
| 4,105,491 A * | 8/1978 | Haase | .................... | B32B 38/06 156/582 |
| 4,312,686 A * | 1/1982 | Smith | .................... | B32B 37/26 156/277 |
| 4,589,942 A * | 5/1986 | Korinek | .................... | B32B 5/18 156/324 |
| 4,605,458 A * | 8/1986 | Nakamura | ............. | B23K 20/04 156/324 |
| 4,612,074 A * | 9/1986 | Smith | ................ | B29D 99/0057 156/240 |
| 4,773,959 A * | 9/1988 | Smith | ....................... | B44C 1/24 156/240 |
| 4,776,912 A * | 10/1988 | Laval | ............... | B29C 66/83413 101/23 |
| 5,087,319 A * | 2/1992 | Held | .................... | B29C 59/046 451/449 |
| 5,118,532 A * | 6/1992 | Batson | ................. | D06N 7/0028 427/398.1 |
| 5,122,212 A * | 6/1992 | Ferguson | ............. | B41M 7/0027 156/543 |
| 5,928,762 A * | 7/1999 | Aizawa | .................. | B29C 43/28 428/156 |
| 6,416,607 B1 | 7/2002 | Tsai et al. | | |
| 8,647,556 B2 * | 2/2014 | Swanson | .................. | B05D 3/12 264/494 |
| 2003/0072919 A1* | 4/2003 | Watts, Jr. | .................. | B32B 3/00 428/203 |
| 2004/0076828 A1* | 4/2004 | Pierson | ................... | B32B 38/06 428/411.1 |
| 2005/0029704 A1* | 2/2005 | Wu | ........................ | B65B 9/042 264/166 |
| 2005/0051931 A1* | 3/2005 | Humlicek | ........... | B41F 23/0406 425/363 |
| 2005/0077001 A1* | 4/2005 | Stabile | .................... | B32B 37/10 156/272.2 |
| 2005/0124242 A1* | 6/2005 | Norvell | .................... | B32B 7/12 442/76 |
| 2005/0173063 A1* | 8/2005 | Hiramoto | ............. | B32B 38/004 156/324 |
| 2007/0116929 A1* | 5/2007 | Fujimori | .................... | B32B 3/30 428/156 |
| 2008/0122129 A1 | 5/2008 | Koivukunnas et al. | | |
| 2008/0210366 A1* | 9/2008 | Chen | .................... | B29C 66/727 156/182 |
| 2008/0246189 A1* | 10/2008 | Kuzuhara | ............... | B29C 41/28 264/334 |
| 2008/0268203 A1* | 10/2008 | Blenkhorn | ............. | D21H 19/16 428/141 |
| 2010/0282162 A1 | 11/2010 | Cho et al. | | |
| 2010/0310793 A1* | 12/2010 | Takizawa | ............... | B32B 27/365 264/1.6 |
| 2011/0227238 A1* | 9/2011 | Mimura | ............. | B29D 11/0074 425/371 |
| 2012/0064298 A1* | 3/2012 | Orr | ........................ | B29C 66/45 428/156 |
| 2012/0094069 A1* | 4/2012 | Lin | ....................... | B29C 55/143 264/293 |
| 2012/0223451 A1* | 9/2012 | Hulseman | ............... | B29C 48/09 264/293 |
| 2012/0321856 A1* | 12/2012 | Afshari | ................. | B29C 48/914 977/773 |
| 2012/0328842 A1* | 12/2012 | Afshari | ................. | B29C 55/023 427/172 |
| 2013/0071589 A1* | 3/2013 | Hannington | ............. | B32B 27/32 264/293 |
| 2013/0228946 A1* | 9/2013 | Comerio | ................. | B32B 37/203 425/150 |
| 2015/0048540 A1* | 2/2015 | Hatakeyama | ......... | B29C 55/045 264/165 |
| 2016/0076182 A1* | 3/2016 | Strube | .................... | B32B 38/06 28/134 |
| 2017/0210109 A1* | 7/2017 | Naeyaert | ................. | B32B 27/12 |
| 2017/0361522 A1 | 12/2017 | Wang et al. | | |
| 2018/0117830 A1* | 5/2018 | Lensing | .................. | B32B 5/022 |
| 2023/0211543 A1 | 7/2023 | Wang et al. | | |

FOREIGN PATENT DOCUMENTS

| | | |
|---|---|---|
| CN | 1616217 A | 5/2005 |
| CN | 101569484 A | 11/2009 |
| CN | 101879498 A | 11/2010 |
| CN | 102101411 A | 6/2011 |
| CN | 105599420 A | 5/2016 |
| CN | 105904823 A | 8/2016 |
| CN | 205767912 U | 12/2016 |
| CN | 205800445 U | 12/2016 |
| DE | 102006019591 B3 | 5/2007 |
| EP | 3257654 A1 | 12/2017 |
| GB | 2343945 A | 5/2000 |
| JP | H06215371 A | 8/1994 |
| JP | H06297570 A | 10/1994 |
| JP | H07276497 A | 10/1995 |
| JP | H0839669 A | 2/1996 |
| JP | H09267570 A | 10/1997 |
| WO | 2016050696 A1 | 4/2016 |
| WO | 2016184581 A1 | 11/2016 |
| WO | 2017215046 A1 | 12/2017 |

\* cited by examiner

LONG DECORATIVE MATERIAL WITH EMBOSSING IN REGISTER WITH PATTERN AND ROLLING METHOD AND DEVICE THEREFOR

CROSS-REFERENCE TO RELATED APPLICATIONS

This application is a continuation of U.S. patent application Ser. No. 15/270,279, filed Sep. 20, 2016, which is a nationalization of PCT Application No. PCT/CN2016/088043, filed Jun. 30, 2016, which claims priority under 35 U.S.C. § 119(a) to Patent Application No(s). 201610415455.9 filed in Republic of China on Jun. 15, 2016, the entire contents of which are hereby incorporated by reference.

BACKGROUND OF THE INVENTION

Field of the Invention

The present invention relates to a polyvinyl chloride (PVC) decorative material, and more particularly, to a PVC decorative material where an embossing on an upper transparent plastic layer is in register with a pattern on a lower printed plastic layer and the length is continuous, and a rolling method and a device for rolling the PVC decorative material. The decorative material may also be other thermoplastic plastic having stretchability.

Description of the Related Art

Polyvinyl chloride (PVC) decorative material is a new and light floor decorative material that is very popular in the world, especially widely popular in Europe, America, and Japan and Korea in Asia. At present, the material has also been accepted by large and medium-sized cities in domestic and is increasingly applied in families, hospitals, schools, office buildings, factories, supermarkets, airport halls, stadiums, and other sites.

The existing PVC decorative material is usually formed by overlaying a transparent plastic layer on the surface (equivalent to a transparent layer, a protective layer, and a wear-resistant layer), an image plastic layer with a pattern in the middle (equivalent to a printing layer, a decorative layer, and a colored film layer), and a base layer in the bottom (equivalent to a bottom layer and a bottom plate). The PVC decorative material in such a structure may either be directly paved on the floor for use or bonded on the surface of a foam board, a laminated board, or a wood-plastic board to form a composite board. With the continuous development of the market, the decorative requirements of the PVC decorative material are increasingly improved. Users not only expect to process an embossing on the surface of the transparent plastic layer to increase a three-dimensional sense of the flooring, but also expect to make the embossing on the transparent plastic layer in register with the pattern on the image plastic layer (such as a wood grain, a stone grain, or a fabric grain), to make the embossing become the wood grain, stone grain, or fabric grain, thereby further improving the sense of reality and the three-dimensional sense of the PVC decorative material and increasing the simulation effect of the flooring.

A lamination method is a method adopted currently for registering the embossing of the transparent plastic layer with the pattern of the image plastic layer. To make the embossed pattern (the embossing for short) on the surface transparent plastic layer in register with the pattern (such as the wood grain, stone grain, or fabric grain) on the image plastic layer (i.e., the plastic layer printed with continuous unit patterns), the transparent plastic layer, the image plastic layer, and the base layer are firstly tailored into rectangle blocks with the same length, wherein the length shall be the length of one unit pattern on the image plastic layer, and then the transparent plastic layer, the image plastic layer, and the base layer are overlaid together in sequence and are placed on a lower pressing plate. The raised pattern on an upper pressing plate is aligned with the corresponding pattern on the image plastic layer through a positioning device, and finally the upper pressing plate is pressed on the transparent plastic layer, heating and pressing. Thus, the embossing pressed on the transparent plastic layer is in register with the pattern of the image plastic layer. The traditional lamination method has great defects: one pressing plate can only press two pieces of pros and cons PVC decorative materials at a time; during mass production, a large number of the pressing plates are required in case of increasing the yield, which leads to high costs and high energy consumption; the pattern on the pressing plate is aligned with the pattern on the image plastic layer, which requires manual operation, resulting in heavy workload and low accuracy rate and causing low production efficiency. Moreover, the length of each piece of the PVC decorative material is fixed, and the patterns of the manufactured flooring are repetitive, which does not comply with the property of natural materials.

U.S. Pat. No. 5,122,212 (filing date is Oct. 27, 1989 and application Ser. No. 07/428,262) discloses a novel improved process for registering the pattern. According to the process, a bottom plate, a decorative layer (transfer printing), and a wear-resistant layer achieve a pattern register effect through a register roller, and during rolling, the pattern on the decorative layer should correspond to the pattern designed on the register roller to press a pattern register effect. The technical solution tries to use a rolling process to improve the traditional lamination method above, so as to register the embossing on the wear-resistant layer with the pattern on the decorative layer. Unfortunately, the technical solution of the patent cannot be applied in practice all the time due to a fatal defect. The fatal defect is that: when the bottom plate, the decorative layer, and the wear-resistant layer are embossed by the register roller synchronously, an longitudinal extension of the decorative layer is unavoidable due to a rolling force and a rolling temperature (over 85° C.), while the grains on the register roller for the embossing will not extend, which will certainly lead to a coincidence deviation between the pattern on the register roller and the pattern on the decorative layer and affect a three-dimensional effect and a simulation effect of the PVC decorative material, so that the product quality cannot be guaranteed. Because the register roller tightly extrudes the decorative layer while embossing, a relative position between the register roller and the decorative layer is tightly pressed by the register roller, which can neither be implemented through adjusting the feeding speed of the printing layer, nor implemented through adjusting the rotation speed of the register roller.

After years of exploration, on May 28, 2003, Chinese Patent Publication No. CN1420025A (application no. is 02149569.6) discloses a Long Floor Decorative Material with Printed Pattern in Register with Embossed Pattern. The patent technology is intended to solve the technical problem that "a printed pattern of a printing layer cannot be in register with an embossed pattern due to transformation (see paragraph 2 in page 5 of the Description)", and this invention "directly uses a glass fiber film made of waterproof stiffener to minimize the transformation of the printed pattern" (see paragraph 2 in page 5 of the Description). Although the method solves the above problem to some degree, the glass fiber film made of waterproof stiffener needs to be added, which increases the process costs and the material costs. The reason why this invention solves the problem to some degree is that once a register deviation exists between the printed pattern of the printing layer and the embossed pattern on the embossing roller along a longitudinal direction during rolling, the patent technology cannot correct the deviation through dynamic adjustment during rolling. Because an embossing roll machine tightly presses the printing layer while embossing, a relative position between the embossing roller and the printing layer cannot be implemented through adjusting the feeding speed of the printing layer and/or adjusting the rotation speed of the embossing roller (having the same defect with that of the U.S. Pat. No. 5,122,212 above).

For decades, those skilled in the art have been keeping exploring an effective way to implement coincidence of the embossing of the transparent plastic layer with the pattern of the image plastic layer, but no breakthrough is achieved. Until now, the coincidence of embossing can only be implemented using the oldest lamination method above in the art.

BRIEF SUMMARY OF THE INVENTION

An objective of the present invention is to provide a rolling method for a long decorative material with an embossing in register with a pattern, which can implement register between the embossing on a transparent plastic layer and the pattern on a printed plastic layer and have high production efficiency, low cost and less energy consumption.

Another problem to be solved by the present invention is to provide a rolling device for a long decorative material with an embossing in register with a pattern, which can be used to process a long decorative material with the embossing in register with the pattern and have high production efficiency, low cost and less energy consumption.

One more problem to be solved by the present invention is to process the long decorative material with the embossing in register with the pattern using the foregoing method and device, which has low cost, good simulation effect and un-limited cutting length and complies with the property of a natural material.

To fulfill the foregoing objective, the present invention adopts the following technical solution.

A rolling method for a long decorative material with an embossing in register with a pattern comprises a feeding step of feeding a layered raw material of a long decorative material to be rolled into oppositely rolling rollers, the layered raw material comprising a transparent plastic layer and a printed plastic layer printed with continuous unit patterns; and a rolling step of hot rolling an embossing on the transparent plastic layer. In the feeding step, the transparent plastic layer is located at one side of the printed plastic layer where the continuous unit patterns are printed, the transparent plastic layer is adjacent to an embossing roller of the oppositely rolling rollers, and an embossed pattern disposed around an outer circle of the embossing roller corresponds to a pattern of one unit pattern on the printed plastic layer. In the rolling step, a longitudinal deviation of the embossing is adjusted. An adjusting step comprises detecting the longitudinal deviation between the embossed pattern on the embossing roller and the corresponding pattern on the printed plastic layer during rolling and adjusting a feeding tension of the printed plastic layer according to the longitudinal deviation, so as to adjust a stretching length of the printed plastic layer before rolling, so that the longitudinal deviation in subsequent rolling is reduced until the embossed pattern is longitudinally in register with the corresponding pattern on the printed plastic layer during rolling, and the embossing hot-rolled on the transparent plastic layer is longitudinally in register with the corresponding pattern on the printed plastic layer.

In one embodiment of the invention, the adjusting step may comprise detecting a position of a preset part on each unit pattern of the printed plastic layer and detecting a position of a corresponding part on the embossing roller corresponding to the preset part at the same time; when the preset part is detected to be ahead of the corresponding part, increase the feeding tension of the printed plastic layer to increase the stretching length of the printed plastic layer before rolling, so as to reduce an ahead value of the preset part in subsequent rolling until a deviation between the preset part and the corresponding part is zero, so that the embossing hot-rolled on the transparent plastic layer is longitudinally in register with the corresponding pattern on the printed plastic layer; and when the preset part is detected to be lagging behind the corresponding part, decrease the feeding tension of the printed plastic layer to decrease the stretching length of the printed plastic layer before rolling, so as to increase a lagged value of the preset part in the subsequent rolling until the deviation between the preset part and the corresponding part is zero, so that the embossing hot-rolled on the transparent plastic layer is longitudinally with the corresponding pattern on the printed plastic layer.

In one embodiment of the invention, a spread length of the embossed pattern disposed around the outer circle of the embossing roller may be 1.01 to 1.5 times of a length a of one unit pattern on the printed plastic layer before stretching; and a heating temperature in the rolling step ranges from 85° C. to 250° C.

In one embodiment of the invention, in the rolling step, the longitudinal deviation of the embossing may be measured by a distance difference or a time difference between the detected preset part on each unit pattern of the printed plastic layer and the detected corresponding part on the embossing roller corresponding to the preset part.

In one embodiment of the invention, during the process of adjusting the longitudinal deviation of the embossing in the rolling step, a lateral deviation of the image may be further adjusted. When a lateral deviation is detected to be existing between the pattern on the printed plastic layer and the embossed pattern on the embossing roller, the plastic layer or the embossing roller may be moved along a lateral direction, so that the pattern on the printed plastic layer is in register with the embossed pattern around the outer circle of the embossing roller on the lateral direction.

In an embodiment of the present invention, the layered raw material of the long decorative material to be rolled may further comprise a plastic base layer. The plastic base layer may be delivered to the oppositely rolling rollers simultaneously in the feeding step, and the plastic base layer is located at the other side of the printed plastic layer opposite to the side printed with the continuous unit patterns.

A rolling device for implementing the rolling method for the long decorative material comprises: a first feeding device, a second feeding device, the oppositely rolling rollers including the embossing roller and a backing roller, and a control device for controlling the first feeding device, the second feeding device and the oppositely rolling rollers. The transparent plastic layer enters the oppositely rolling rollers from the first feeding device, and the printed plastic layer enters the oppositely rolling rollers from the second feeding device. The transparent plastic layer is located at the side of the printed plastic layer printed with the continuous unit patterns, and the transparent plastic layer is adjacent to the embossing roller. The rolling device further comprises a detecting device for detecting the longitudinal deviation between the embossed pattern on the embossing roller and the corresponding pattern on the printed plastic layer during rolling, and a tension controller disposed on the second feeding device; when the detecting device detects that the longitudinal deviation appears between the embossed pattern on the embossing roller and the corresponding pattern on the printed plastic layer, the control device controls the tension controller to adjust the tension of the printed plastic layer between the second feeding device and the oppositely rolling rollers according to the longitudinal deviation, so as to adjust the stretching length of the printed plastic layer before rolling, so that the longitudinal deviation in subsequent rolling is reduced until the embossed pattern is in register with the corresponding pattern on the printed plastic layer during rolling, and the embossing hot-rolled on the transparent plastic layer is longitudinally in register with the corresponding pattern on the printed plastic layer.

In one embodiment of the invention, the control device may control a heating temperature to be between 85° C. and 250° C. through controlling a hot medium flowing into the oppositely rolling rollers, and a spread length of the embossed pattern disposed around the outer circle of the embossing roller may be 1.01 to 1.5 times of the length of one unit pattern on the printed plastic layer before stretching.

In one embodiment of the invention, the detecting device may comprise a first sensor for detecting a position of a preset part in each unit pattern on the printed plastic layer and a second sensor for detecting a position of a corresponding part on the embossing roller corresponding to the preset part, and the control device may use a distance difference or a time difference of signals detected by the two sensors as the longitudinal deviation of the embossing in the rolling step to control the tension of the printed plastic layer between the second feeding device and the oppositely rolling rollers, so as to adjust the stretching length of the printed plastic layer before rolling, so that the longitudinal deviation in subsequent rolling is reduced until the embossed pattern is in register with the corresponding pattern on the printed plastic layer during rolling, and the embossing hot-rolled on the transparent plastic layer is longitudinally in register with the corresponding pattern on the printed plastic layer.

In one embodiment of the invention, the first sensor may be a color mark sensor or an image sensor, and the second sensor (82) may be a position sensor, a displacement sensor, or a rotation speed sensor.

In one embodiment of the invention, a magnetic powder brake may be adopted as the tension controller and may be disposed on a feeding axle of the second feeding device.

In one embodiment of the invention, a lateral rectification device may be further comprised. The lateral rectification device may comprise a third sensor for detecting a lateral deviation of the unit pattern on the printed plastic layer and a lateral transmission gear for making the second feeding device move along a lateral direction, and the control device may control the lateral transmission gear according to the lateral deviation of the unit pattern on the printed plastic layer detected by the third sensor, so as to make the second feeding device move along the lateral direction correspondingly, so that the pattern on the printed plastic layer is in register with the embossed pattern around the outer circle of the embossing roller on the lateral direction.

In one embodiment of the invention, a third feeding device for feeding a plastic base layer in the oppositely rolling rollers may be further comprised. The plastic base layer may be adjacent to the backing roller and may be hot-rolled on the other side of the printed plastic layer opposite to the transparent plastic layer by the embossing roller and the backing roller.

The long decorative material with the embossing in register with the pattern manufactured by the rolling method comprises the transparent plastic layer and the printed plastic layer, wherein the embossing hot-rolled on the transparent plastic layer is in register with the pattern on the printed plastic layer.

In one embodiment of the invention, the long decorative material may further comprise a plastic base layer hot-rolled below the printed plastic layer.

Compared with the prior art, the present invention has the following beneficial effects. The above-mentioned conventional ways of the prior art are broken by employing the foregoing rolling method for the long decorative material with the embossing in register with the pattern. In the rolling step, the feeding tension of the printed plastic layer is adjusted according to the longitudinal deviation between the embossed pattern on the embossing roller and the corresponding pattern on the printed plastic layer, so as to adjust the stretching length of the image plastic layer before rolling, so that the longitudinal deviation in subsequent rolling is reduced until the embossed pattern is in register with the corresponding pattern on the printed plastic layer during rolling, and the embossing hot-rolled on the transparent plastic layer is longitudinally in register with the corresponding pattern on the printed plastic layer. This method can correct the deviation between the embossing and the pattern through the dynamic adjustment during the process of rolling. The processing of registering the embossing on the transparent plastic layer with the pattern on the printed plastic layer is realized through the rolling method for hot rolling the transparent plastic layer and the printed plastic layer, greatly reducing the production costs and the energy losses, which is a major breakthrough for flooring processing.

After one embossing roller is manufactured, the spread length of the embossed pattern on the outer circle thereof is fixed, so that the spread length of the embossed pattern disposed around the outer circle of the embossing roller is 1.01 to 1.5 times of the length of one unit pattern on the printed plastic layer before stretching (for a specific embossing roller, the spread length of the embossed pattern disposed around the outer circle thereof is a certain value between 1.01 a and 1.5 a), so that the pattern on the stretched printed plastic layer is in register with the embossed pattern on the outer circle of the embossing roller, thereby realizing the embossing on the transparent plastic layer in register with the pattern on the printed plastic layer.

The present invention has further beneficial effects. According to the rolling device for implementing the rolling method for the long decorative material, the second feeding device and the oppositely rolling rollers are improved on the basis of the existing device, wherein the tension controller is additionally disposed on the second feeding device, and the detecting device for detecting the longitudinal deviation between the embossed pattern on the embossing roller and the corresponding pattern on the printed plastic layer during rolling is additionally added. When the printed plastic layer on the second feeding device is mechanically transferred or manually fed to the oppositely rolling rollers, the oppositely rolling rollers will have a tensile force of rolling the printed plastic layer into the oppositely rolling rollers; when the detecting device detects that the longitudinal deviation appears between the embossed pattern on the embossing roller and the corresponding pattern on the printed plastic layer, the control device controls the tension controller to adjust the tension of the printed plastic layer between the second feeding device and the oppositely rolling rollers according to the longitudinal deviation, so as to adjust the stretching length of the printed plastic layer before rolling and adjust the relative position between the oppositely rolling rollers and the printed plastic layer through the change of the stretching length of the printed plastic layer, thereby decreasing the longitudinal deviation during the subsequent rolling until the embossed pattern on the embossing roller is in register with the corresponding pattern on the printed plastic layer during rolling. Thus, the embossing hot-rolled on the transparent plastic layer is longitudinally in register with the corresponding pattern on the printed plastic layer. This device can use the rolling method to implement a processing method of registering the embossing of the transparent plastic layer with the pattern of the printed plastic layer, thereby improving the production efficiency by dozens of times, greatly reducing the production costs and the energy losses, which is a major breakthrough for the flooring processing.

For the long decorative material with the embossing in register with the pattern manufactured by the rolling method, the embossing hot-rolled on the transparent plastic layer is in register with the pattern on the printed plastic layer, thereby enhancing the sense of reality and the three-dimensional sense of the decorative material, which improves the simulation effect of the decorative material and has low production cost in unit area and high production efficiency. Moreover, because the long decorative material is manufactured by the continuous rolling of the oppositely rolling rollers, the length thereof is greater than that of the decorative material processed using the lamination method in the prior art, and the long decorative material is the decorative material having continuous length (including a plurality of continuous unit patterns). Different cutting positions can be set for such a long decorative material decorative material having the continuous length, the cutting lengths are not limited, and the patterns of cut blocks are not repetitive. The flooring plank formed by bonding the blocks on the surface of a foaming board, a laminated board, a plastic base layer, or a wood-plastic board complies with the property of a natural material better.

DETAILED DESCRIPTION OF THE INVENTION

Figure 1:
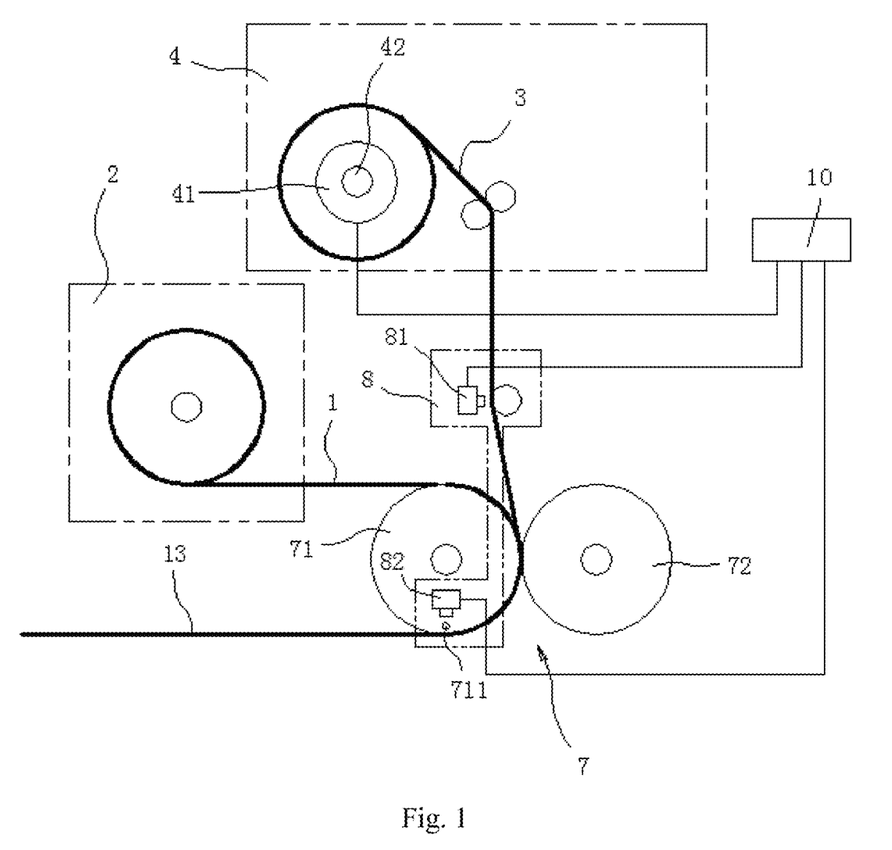
FIG. 1 is a structure diagram of a processing device according to one embodiment of the present invention.
Figure 2:
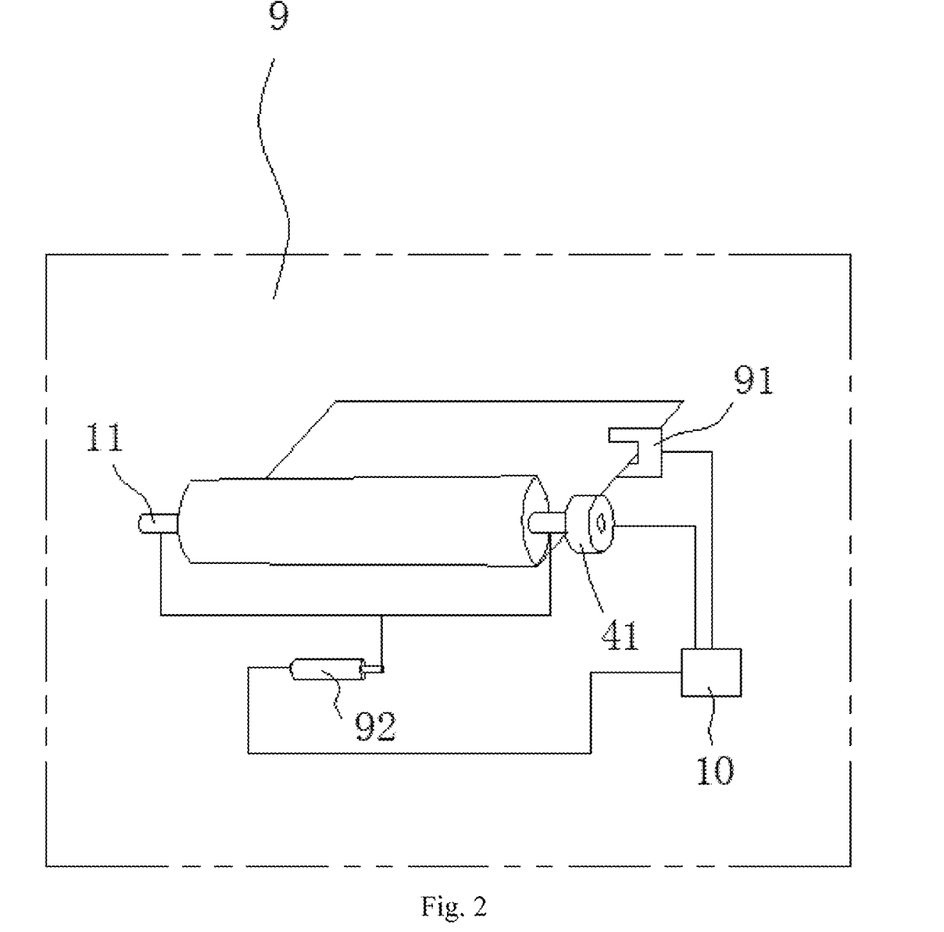
FIG. 2 is a structure diagram of a second feeding device according to one embodiment of the present invention.
Figure 3:
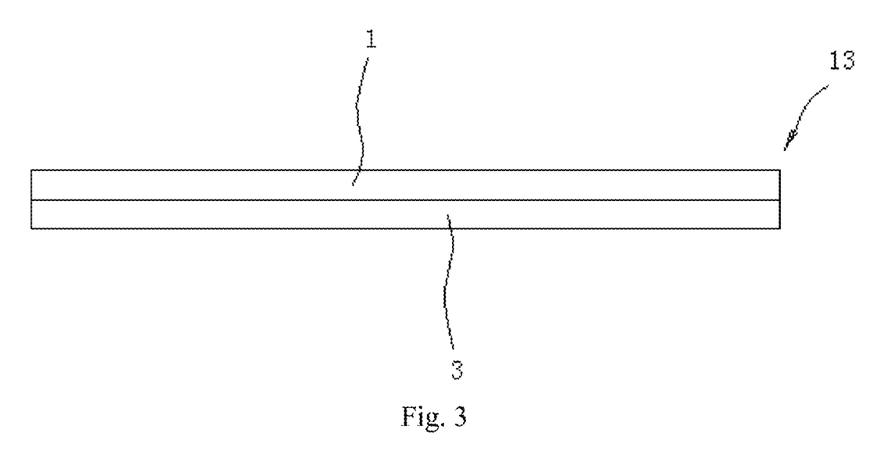
FIG. 3 is a sectional structural diagram of a long decorative material with an embossing in register with a pattern according to one embodiment of the invention.
Figure 4:
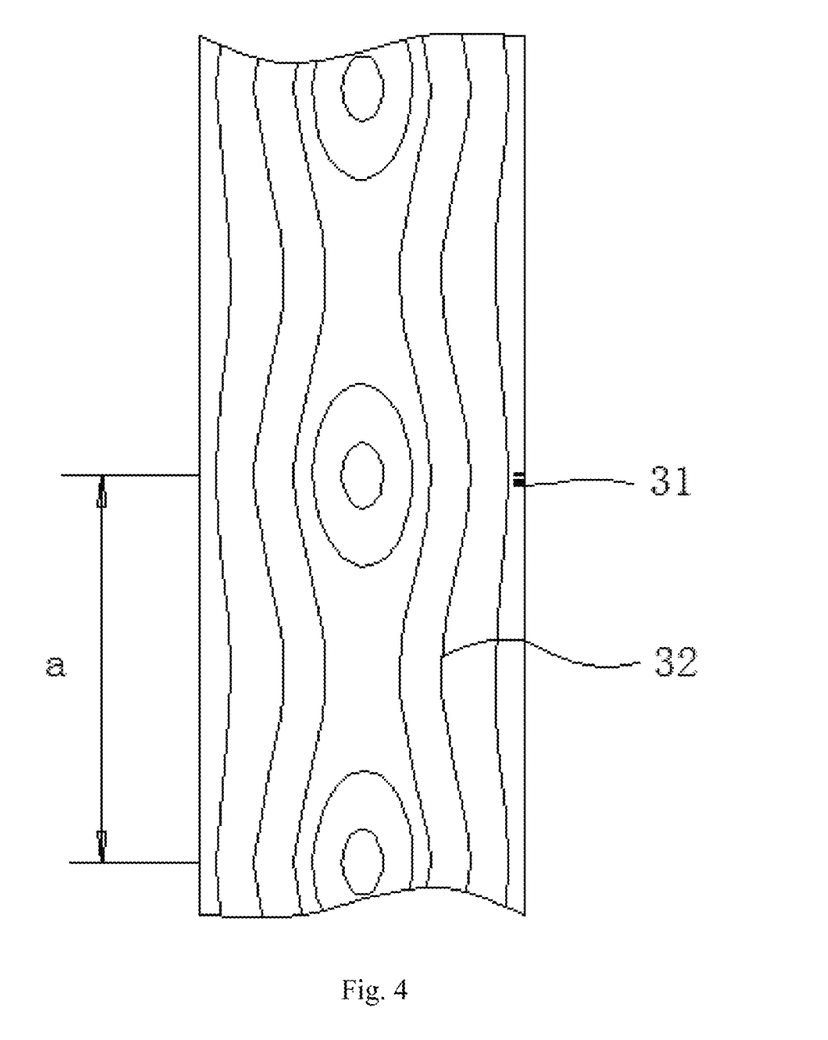
FIG. 4 is a structure diagram of unit patterns connected end to end according to one embodiment of the invention.
Figure 5:
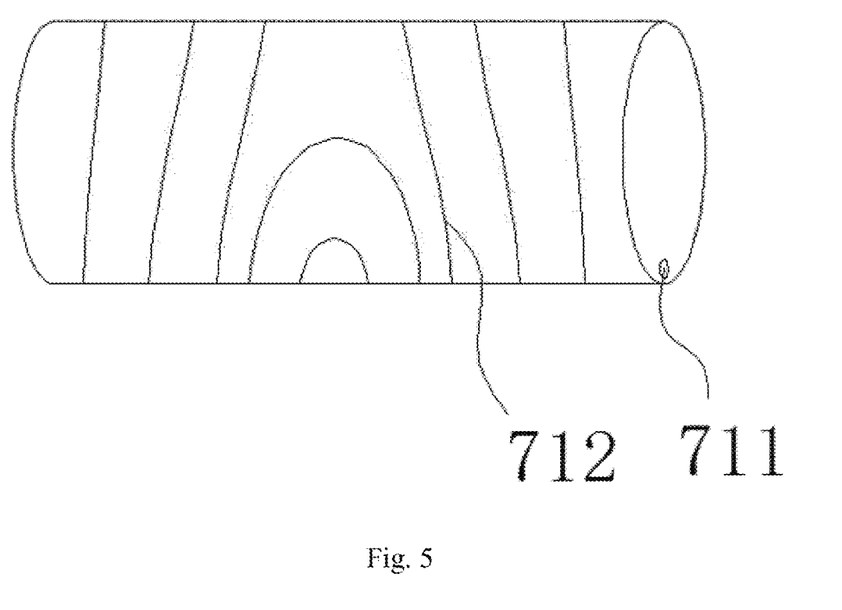
FIG. 5 is a structure diagram of an embossing roller according to one embodiment of the invention.
Figure 6:
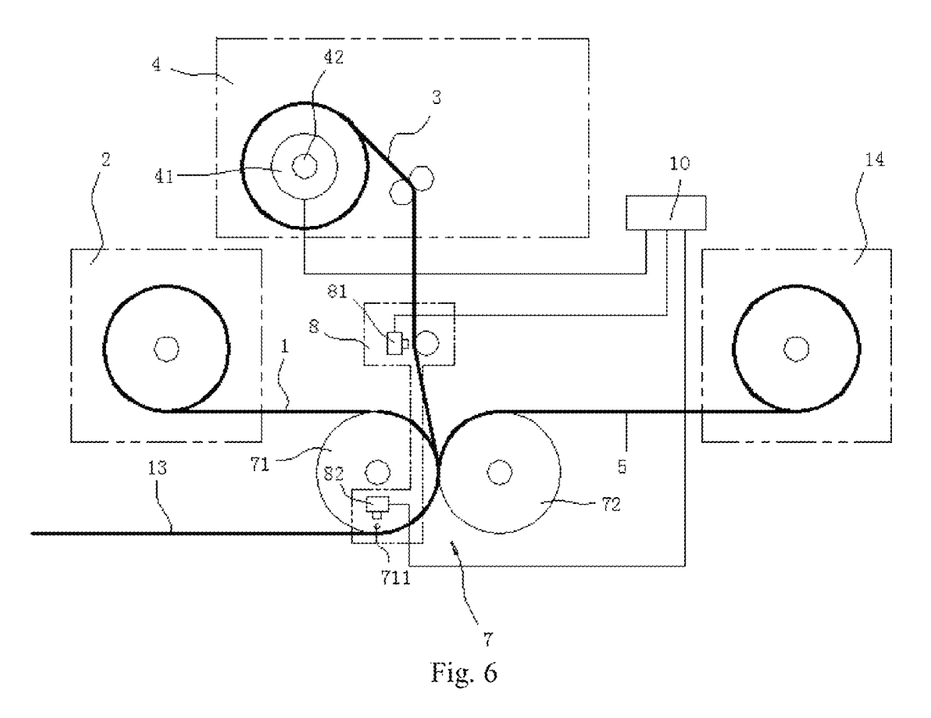
FIG. 6 is a structure diagram of a third feeding device additionally disposed in FIG. 1.

In order to represent the technical solution of the present invention more clearly, the present invention will be explained in details with reference to the accompanying drawings FIG. 1 to FIG. 6 hereinafter. It is to be understood that the detailed embodiments described in the description are only intended to interpret the present invention, rather than to define the protection scope of the present invention.

The present invention relates to a rolling method for a long decorative material with an embossing in register with a pattern, comprising: a feeding step of feeding a layered raw material of a long decorative material 13 to be rolled into oppositely rolling rollers 7, the layered raw material comprising a transparent plastic layer 1 and a printed plastic layer 3 printed with continuous unit patterns; and a rolling step of hot rolling an embossing on the transparent plastic layer 1.

In the feeding step, the transparent plastic layer 1 is located at one side of the printed plastic layer 3 where the continuous unit patterns are printed, the transparent plastic layer 1 is adjacent to an embossing roller 71 of the oppositely rolling rollers 7, and an embossed pattern 712 disposed around an outer circle of the embossing roller 71 corresponds to a pattern 32 of one unit pattern on the printed plastic layer 3. Optionally, a spread length of the embossed pattern 712 disposed around the outer circle of the embossing roller 71 is 1.01 to 1.5 times of a length a of one unit pattern on the printed plastic layer 3 before stretching. In a lateral direction, the width of the printed plastic layer 3 changes little after the stretching, and a deviation of the embossing in a width direction is hard to be visually noticed and can be neglected. Optionally, the width of the embossed pattern 712 on the outer circle of the embossing roller 71 is 0.95-1 times of the width of the unit pattern on the printed plastic layer 3 before stretching.

In the rolling step, a longitudinal deviation of the embossing is adjusted. The adjusting step comprises detecting the longitudinal deviation between the embossed pattern 712 on the embossing roller 71 and the corresponding pattern 32 on the printed plastic layer 3 during rolling and adjusting a feeding tension of the printed plastic layer 3 according to the longitudinal deviation, so as to adjust a stretching length of the printed plastic layer 3 before rolling, so that the longitudinal deviation in subsequent rolling is reduced until the embossed pattern 712 is in register with the corresponding pattern 32 on the printed plastic layer 3 during rolling. Thus, the embossing hot-rolled on the transparent plastic layer 1 is longitudinally in register with the corresponding pattern 32 on the printed plastic layer 3.

The longitudinal deviation of the embossing is measured by a distance difference or a time difference between a detected preset part 31 on each unit pattern of the printed plastic layer 3 and a detected corresponding part 711 on the embossing roller 71 corresponding to the preset part 31. Optionally, the adjusting step comprises: detecting the position of the preset part 31 on each unit pattern of the printed plastic layer 3 and detecting the position of the corresponding part 711 on the embossing roller 71 corresponding to the preset part 31 at the same time. When the preset part 31 is detected to be ahead of the corresponding part 711, increase the feeding tension of the printed plastic layer 3 to increase the stretching length of the printed plastic layer 3 before rolling, so as to reduce an ahead value of the preset part 31 in subsequent rolling until the deviation between the preset part 31 and the corresponding part 711 is zero, so that the embossing hot-rolled on the transparent plastic layer 1 is longitudinally in register with the corresponding pattern 32 on the printed plastic layer 3. When the preset part 31 is detected to be lagging behind the corresponding part 711, decrease the feeding tension of the printed plastic layer 3 to decrease the stretching length of the printed plastic layer 3 before rolling, so as to increase a lagged value of the preset part 31 in the subsequent rolling until the deviation between the preset part 31 and the corresponding part 711 is zero, so that the embossing on the transparent plastic layer 1 is longitudinally in register with the corresponding pattern 32 on the printed plastic layer 3. Certainly, the register mentioned herein refers to register in a deviation range hard to be visually noticed, for example, the deviation is 0-2 mm and is preferably 0-0.5 mm.

Optionally, the control device 10 controls a heating temperature to be between 85° C. and 250° C. through controlling a hot medium flowing into the oppositely rolling rollers 7.

During the process of adjusting the longitudinal deviation of the embossing in the rolling step, a lateral deviation of the pattern is further adjusted. When a lateral deviation is detected to be existing between the pattern 32 on the printed plastic layer 3 and the embossed pattern 712 on the embossing roller 71, the transparent plastic layer 1 or the embossing roller 71 is moved along a lateral direction, so that the pattern 32 on the printed plastic layer 3 is in register with the embossed pattern 712 around the outer circle of the embossing roller 71 on the lateral direction.

Further, the layered raw material of the long decorative material 13 to be rolled further comprises a plastic base layer 5. The plastic base layer 5 is delivered to the oppositely rolling rollers 7 simultaneously in the feeding step, and the plastic base layer 5 is located at the other side of the printed plastic layer 3 opposite to the side printed with the continuous unit patterns.

A rolling device for implementing the rolling method for the long decorative material 13 comprises: a first feeding device 2, a second feeding device 4, the oppositely rolling rollers 7 including the embossing roller 71 and a backing roller 72, a control device 10 for controlling the first feeding device 2, the second feeding device 4 and the oppositely rolling rollers 7, a detecting device 8 for detecting the longitudinal deviation between an embossed pattern 712 on the embossing roller 71 and the corresponding pattern 32 on the printed plastic layer 3 during rolling, and a tension controller 41 disposed on the second feeding device 4. The transparent plastic layer 1 enters the oppositely rolling rollers 7 from the first feeding device 2, and the printed plastic layer 3 enters the oppositely rolling rollers 7 from the second feeding device 4. The transparent plastic layer 1 is located at one side of the printed plastic layer 3 printed with the continuous unit patterns, and the transparent plastic layer 1 is adjacent to the embossing roller 71. As described in the foregoing rolling method for the long decorative material 13, the embossed pattern 712 disposed around the outer circle of the embossing roller 71 corresponds to the pattern 32 of one unit pattern on the printed plastic layer 3, and optionally, the spread length of the embossed pattern 712 disposed around the outer circle of the embossing roller 71 is 1.01 to 1.5 times of the length a of one unit pattern on the printed plastic layer 3 before stretching. When the printed plastic layer 3 on the second feeding device 4 is mechanically transferred or manually fed to the oppositely rolling rollers 7, the oppositely rolling rollers 7 will have a tensile force of rolling the printed plastic layer 3 into the oppositely rolling rollers 7. When the detecting device 8 detects that the longitudinal deviation appears between the embossed pattern 712 on the embossing roller 71 and the corresponding pattern 32 on the printed plastic layer 3, the control device 10 controls the tension controller 41 to adjust the tension of the printed plastic layer 3 between the second feeding device 4 and the oppositely rolling rollers 7 according to the longitudinal deviation, so as to adjust the stretching length of the printed plastic layer 3 before rolling, thereby decreasing the longitudinal deviation in the subsequent rolling until the embossed pattern 712 on the embossing roller 71 is in register with the corresponding pattern 32 on the printed plastic layer 3 during rolling. Thus, the embossing hot-rolled on the transparent plastic layer 1 is longitudinally in register with the corresponding pattern 32 on the printed plastic layer 3. Optionally, the detecting device 8 comprises a first sensor 81 for detecting a position of the preset part 31 in each unit pattern on the printed plastic layer 3 and a second sensor 82 for detecting the position of the corresponding part 711 on the embossing roller 71 corresponding to the preset part 31. The control device 10 uses a distance difference or a time difference of signals detected by the two sensors 81 and 82 as the longitudinal deviation of the embossing in the rolling step to control the tension of the printed plastic layer 3 between the second feeding device 4 and the oppositely rolling rollers 7, so as to adjust the stretching length of the printed plastic layer 3 before rolling, so that the longitudinal deviation in the subsequent rolling is reduced until the embossed pattern 712 is in register with the corresponding pattern 32 on the printed plastic layer 3 during rolling. Thus, the embossing hot-rolled on the transparent plastic layer 1 is longitudinally in register with the corresponding pattern 32 of the printed plastic layer 3. Optionally, the first sensor 81 is a color mark sensor or an image sensor, the second sensor 82 is a position sensor, a displacement sensor, or a rotation speed sensor, and a magnetic powder brake is adopted as the tension controller 41 and is disposed on a feeding axle 42 of the second feeding device 4.

The preset part 31 is preferably a partial pattern of a certain part on each unit pattern of the printed plastic layer 3 or is preferably a chromatic printing line (may either be a black chromatic line, or a color chromatic line in other colors) at the side of the printed plastic layer 3. A color mark sensor is adopted as the first sensor 81, the corresponding part 711 is a magnetic block disposed at an end face of the embossing roller 71, and a Hall sensor is adopted as the second sensor 82. The embossed pattern 712 on the embossing roller 71 corresponding to the magnetic block corresponds to the pattern 32 on the printed plastic layer 3 corresponding to the preset part 31.

In the lateral direction, the width of the printed plastic layer 3 changes little after the stretching, and the deviation of the embossing in the width direction is hard to be visually noticed and can be neglected. Optionally, the width of the embossed pattern 712 on the outer circle of the embossing roller 71 is 0.95-1 times of the width of the unit pattern on the printed plastic layer 3 before stretching. To prevent the printed plastic layer 3 from deviation during feeding, a lateral rectification device 9 may be disposed. The lateral rectification device 9 includes a third sensor 91 for detecting a lateral deviation of the unit pattern on the printed plastic layer 3 and a lateral transmission gear 92 for making the second feeding device 4 move along the lateral direction. The control device 10 controls the lateral transmission gear 92 according to the lateral deviation of the unit pattern on the plastic layer 3 detected by the third sensor 91, so as to make the second feeding device 4 move along the lateral direction correspondingly, so that the pattern 32 on the printed plastic layer 3 is in register with the embossed pattern 712 around the outer circle of the embossing roller 71 on the lateral direction. During practical application, a third feeding device 14 for feeding a plastic base layer 5 in the oppositely rolling rollers 7 may also be additionally disposed. The plastic base layer 5 is adjacent to the backing roller 72 and is hot-rolled on the other side of the printed plastic layer 3 opposite to the transparent plastic layer 1 by the embossing roller 71 and the backing roller 72.

The long decorative material 13 with the embossing in register with the pattern manufactured using the foregoing rolling method comprises the transparent plastic layer 1 and the printed plastic layer 3. The embossing hot-rolled on the transparent plastic layer 1 is in register with the pattern 32 on the printed plastic layer 3. Optionally, the long decorative material 13 further comprises a plastic base layer 5 hot-rolled below the printed plastic layer 3.

The transparent plastic layer, the printed plastic layer, and the plastic base layer according to the foregoing solutions of the present invention refer to a PVC material layer, and certainly, may also refer to other thermoplastic layer with stretchability or other materials having similar functions.

The invention claimed is:

1. A method for manufacturing flooring planks comprising a plastic base layer and a printed plastic layer; said printed plastic layer comprising at least a portion of a single unit of a printed continuous pattern and an embossing in register with said printed continuous pattern;

said method comprising providing a decorative material of continuous length by at least feeding the plastic base layer, the printed plastic layer and a transparent plastic layer into oppositely rolling rollers; said transparent plastic layer having a front side and a back side;

wherein said printed plastic layer comprises at least a repetition of units of said printed continuous pattern at a side adjacent the back side of said transparent plastic layer; wherein a unit of said printed continuous pattern has an unstretched length; said oppositely rolling rollers comprising an embossing roller and a backing roller; said embossing roller having an outer cylinder and an embossed pattern disposed around said outer cylinder; wherein the length of said embossed pattern is 1.01 to 1.5 times said unstretched length of said unit of said printed continuous pattern;

wherein said printed plastic layer is stretched to yield a stretched length of said unit of said printed continuous pattern that matches said length of said embossed pattern, and wherein said front side of said transparent plastic layer is adjacent to said embossing roller; wherein the plastic base layer is adjacent to said backing roller and adjacent to a back side of said printed plastic layer; and said method further comprising cutting said decorative material in a plurality of cut blocks that are devoid of repeating units of said printed continuous pattern, and forming a flooring plank using at least a portion of a single cut block;

wherein the method further comprises the step of controlling a heating temperature of the embossing roller and/or the backing roller;

wherein said step of controlling is executed by a control device controlling a hot medium flowing into the oppositely rolling rollers.

2. The method of claim 1, wherein said method further comprises hot rolling the plastic basic layer to said back side of said printed plastic layer.

3. The method of claim 1, wherein said repetition of units of said printed continuous pattern comprises identical units connected end to end.

4. The method of claim 1, wherein said unit comprises a main pattern and a separate preset part.

5. The method of claim 4, wherein said preset part is positioned at a side of said printed plastic layer.

6. The method of claim 5, wherein said preset part comprises a chromatic printing line.

7. The method of claim 5, wherein said embossing roller comprises an embossed pattern at least corresponding to said preset part.

8. The method of claim 1, wherein said plastic base layer and said printed plastic layer are fed into said oppositely rolling rollers by means of two separate feeding devices.

9. The method of claim 1, wherein said plastic base layer, said transparent plastic layer and said printed plastic layer are a thermoplastic material layer.

10. The method of claim 1, wherein said plastic base layer and said printed plastic layer both are a PVC material layer.

* * * * *